United States Patent [19]

Essell, deceased et al.

[11] E Re. 31,045

[45] Reissued Oct. 5, 1982

[54] SNOWPLOW BLADE EXTENSION

[76] Inventors: Albert E. Essell, deceased, late of Twinsburg, Ohio; by Virginia G. Essell, executrix, 9324 Ravenna Rd., Twinsburg, Ohio 44087; Robert A. T. Essell, 6158 State Rte. 303, Ravenna, Ohio 44266; Christopher W. Essell, 9324 Ravenna Rd., Twinsburgh, Ohio 44087

[21] Appl. No.: 123,671

[22] Filed: Feb. 22, 1980

Related U.S. Patent Documents

Reissue of:

[64] Patent No.: 4,073,077
Issued: Feb. 14, 1978
Appl. No.: 756,148
Filed: Jan. 3, 1977

[51] Int. Cl.[3] ..... E01H 5/00

[52] U.S. Cl. ..... 37/281; 172/777

[58] Field of Search ..... 37/41, 42, 50, 104; 172/777, 784, 782

[56] References Cited

U.S. PATENT DOCUMENTS

| | | | |
|---|---|---|---|
| 2,746,181 | 5/1956 | Molene et al. | 172/784 |
| 2,840,932 | 7/1958 | Breyer | 172/777 |
| 3,034,237 | 5/1962 | Wolfe et al. | 37/41 X |
| 3,039,209 | 6/1962 | Cron et al. | 172/777 |
| 3,803,733 | 4/1974 | Ramsey | 37/50 X |

FOREIGN PATENT DOCUMENTS

| | | | |
|---|---|---|---|
| 261668 | 8/1967 | Austria | 37/58 |
| 796483 | 10/1968 | Canada | 172/784 |

*Primary Examiner*—E. H. Eickholt
*Attorney, Agent, or Firm*—Harold S. Meyer

[57] ABSTRACT

Snowplow blades can be immediately varied in length at one or both ends by providing extensions of the same shape as the blade, which extensions carry studs which are received in sockets, preferably lengthwise of the back of the blade. The studs are pinned in the sockets for quick and easy fastening and removal.

10 Claims, 4 Drawing Figures

SNOWPLOW BLADE EXTENSION

Matter enclosed in heavy brackets [ ] appears in the original patent but forms no part of this reissue specification; matter printed in italics indicates the additions made by reissue.

BACKGROUND

Snow removal from other than highways is a major and essential activity, involving small and medium size vehicles such as the small four-wheel drive vehicles known as Jeeps, or pickup trucks, equipped with removable snowplow blades for clearing snow from parking lots, service stations, driveways, and even sidewalks. The blades are generally of fixed length slightly greater than the width of the vehicle, and are supported by adjustable framework permitting the blade to be held against the ground or to be lifted well above the ground for transit to and from the place of use, and also permitting the blade to be perpendicular to the direction of motion for pushing snow ahead to an out of the way location or to be at an angle for pushing the snow to one side or the other.

Such blades are necessarily limited in length transversely of the vehicle for compliance with regulations as to overall dimensions of road vehicles and as to extent of projection beyond the vehicle structure, and also to permit passage through restricted spaces such as between gateposts or trees. The consequence is that effective snow removal generally requires many more trips of the vehicle, and therefore much greater expense than would be the case with longer snowplow blades on the same vehicle.

This problem has been dealt with in the past by equipping heavy vehicles specifically designed for snow removal with wings or extensions which can be extended or retracted by mechanism actuated from the driver's location, to suit the condition which may be encountered. For smaller vehicles, some use has been made of extensions which can be bolted to one or both ends of the snowplow blade when needed, and stowed in the body of the vehicle when not needed. The former mechanized adjustment of width is far too expensive for other than highway use, and the latter is too cumbersome and inconvenient because of the need for tools, the likelihood of loss of the nuts and bolts, and the problem of finding a satisfactory stowage location when the extensions are not being used. The consequence is that almost all snow removal is carried out with snowplow blades of fixed length.

SUMMARY OF THE INVENTION

I have found that snowplows, and particularly those mounted on light vehicles, can be equipped quite inexpensively with snowplow blade extensions of a sturdy construction, yet so simple that the blade can be converted from its basic length to an extended length and vice versa in a matter of seconds.

The invention which makes this desirable result so easily possible involves provision of one or a pair of snowplow blade extensions matching the curvature or other shape of the basic snowplow blade, and provided with projecting supports which can be inserted in sockets in or on the basic snowplow blade and be pinned in place.

This invention peferably involves also auxiliary sockets for mounting the snowplow blade extensions on the basic snowplow blade in an inactive position for convenience and safety in travel to and from work sites, and for rapid and simple transfer to the operating position, without the need for using any tools, or at most anything capable of delivering a light blow such as a rock, a chunk of wood, or a small hammer.

THE DRAWINGS

In the accompanying drawings, FIG. 1 is a representation of the manner in which a conventional snowplow blade is mounted on the front of a light motorized vehicle.

DETAILED DESCRIPTION

Figure 1:
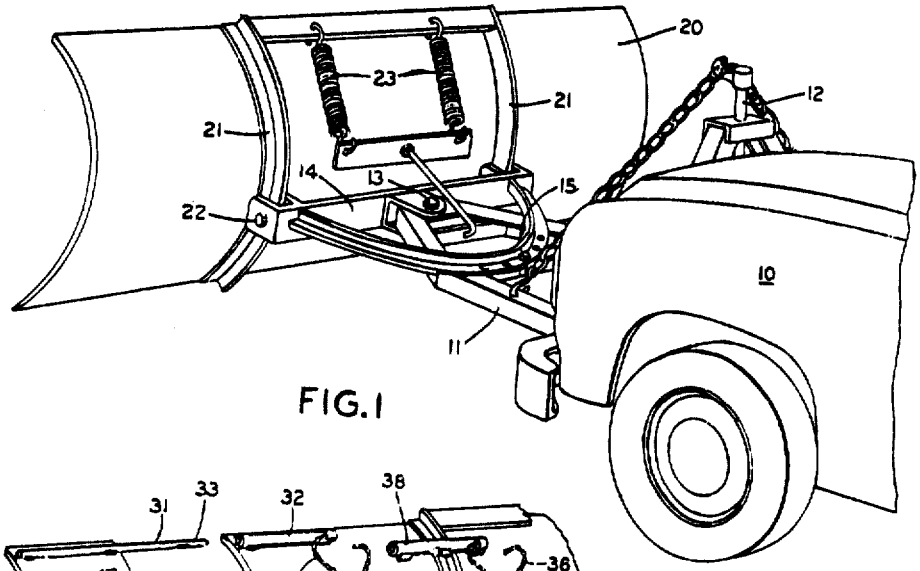

Referring to FIG. 1, conventional snowplows for small and medium motorized vehicles, such as light truck 10, generally have a horizontal A-frame 11 mounted on a horizontal transverse pivot, not shown, under the front end of the vehicle frame.

The A-frame 11 is normally raised to a travel position and lowered to a working position by a manually operated or power driven lifting device 12. At the tip of the A-frame 11 a vertical pivot 13 supports a horizontal bar 14 which can be swung into various transverse or angular positions with respect to the direction of motion of vehicle 10 and held in the desired position as by pin 15.

A snowplow blade 20 having the general shape of a segment of a cylinder has two arcuate stiffener bars 21 of curved angle iron extending from top to bottom on its rear face, with pivot pins 22 connecting the ends of horizontal bar 14 to the flanges of stiffeners 21 so that the blade 20 can pivot on the transverse axis through pivot pins 22.

The blade 20 is held in a generally vertical position with its concave face forward by springs 23. If the bottom edge of blade 20 should strike an immovable and perhaps hidden object such as a curb, a rock, or a stump, the springs permit the blade 20 to tilt and slide over the obstacle.

In accordance with this invention, a conventional snowplow blade such as that described above is modified by providing sockets for mounting an extension at one end of the blade, or a pair of extension for both ends.

Figure 2:
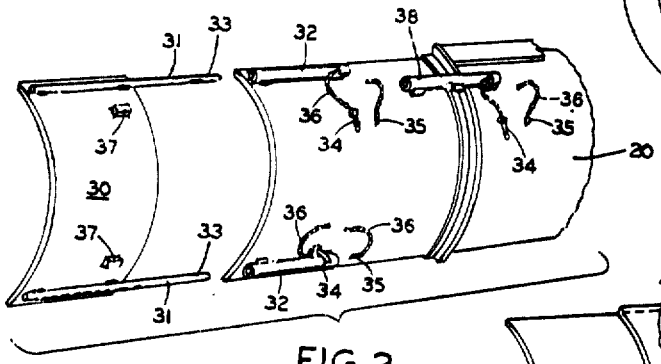
FIG. 2 shows a preferred form of snowplow blade extension for mounting on a conventional blade, and the modification of the basic blade for receiving the extension.

Referring to FIG. 2, showing a preferred form of the invention, an extension 30 is made from the same kind and curvature of steel plate as the blade 20. To the extension are welded a pair of mounting studs 31, which may be solid rods, or may be tubular for greater lightness and stiffness. The studs 31 extend horizontally across the back of extension 30 close to the top and bottom edges.

To the back of blade 20, close to the top and bottom in a position corresponding to the location of studs 31 are welded a pair of tubular sockets 32 of a size permitting studs 31 to pass easily through so that the extension 30 will fit snugly against the edge of blade 20.

Each stud 31 has a hole 33 in its free end which projects beyond the socket 32 to receive a locking pin 34. In turn locking pin 34 is drilled to receive a spring clip 35 to prevent locking pin 34 from bouncing out of its position in hole 33. Each pin 34 and clip 35 is fastened to blade 20 by a light chain 36 so that it cannot be lost.

Practical experience in use of the arrangement described above is that the extensions are easily installed and removed if reasonable clearances are provided between the studs 31 and sockets 32, except when working in wet snow, when there may be some tendency for ice to form in the interstices, as well as around locking pins 34 and spring clips 35. Even then, the foregoing construction permits easy loosening and removal of spring clips 35, and then locking pins 34 by a light tap. Removal of studs 31 from sockets 32 is not quite so simple because it is necessary to move both fastenings together along parallel paths, or each one alternately with the other for a short distance, particularly if the extension should become bent and not restored exactly to its original condition. It is accordingly preferred to weld hammer pads 37 to each extension close to each mounting 31. A few taps of a hammer or other solid object against pads 37 will remove extension 30 very quickly without battering or otherwise damaging the mounting studs 31.

Convenient use of extensions requires provision of a place for carrying them when they are not in use. Accordingly, an extra socket 28 is welded to the back of blade 20 in a location such that extension 30 can be supported by socket 38 on the back of blade 20 without projecting beyond its lateral edge. This socket 38 is provided with a locking pin 34 and spring clip 35 to prevent loss of the extension 30 during activities not requiring the extension to be in its operating position. This carrying socket 38 must, of course, have its axis spaced somewhat farther from the surface of blade 20 than socket 32 to allow for the thickness of the extension 30. A lower socket is not required in this inactive position of extension 30.

Although the preferred form of the invention described above is quite simple in construction and reliable and convenient in use, many other arrangements for quick and firm mounting and removal of a blade extension are possible.

Figure 4:
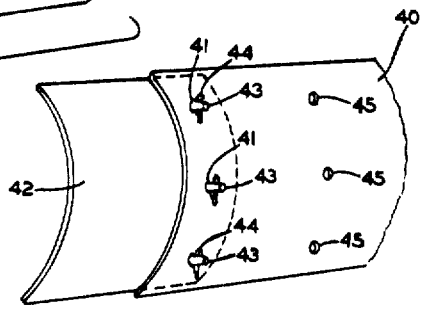
FIG. 4 shows an alternative arrangement for fastening a snowplow blade extension.
Figure 3:
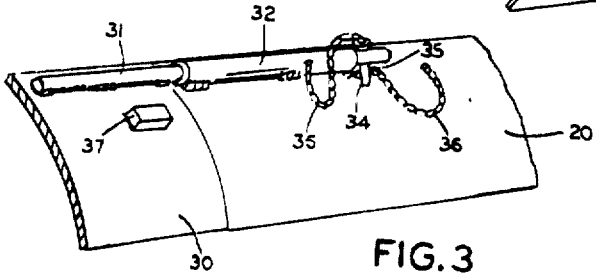
FIG. 3 is a view of an enlarged scale of the simple holding and fastening arrangement of FIG. 2.

FIG. 4 shows one such alternative in which snowplow blade 40 is drilled with holes 41 in two or more locations near a lateral edge, to function as sockets for holding an extension of the blade. An extension 42 in this case is made longer than the desired amount by which the blade is to be extended, by a distance sufficient to extend somewhat beyond each drilled hole 41. Studs 43 are welded to the back of extension 42 in locations corresponding to those of holes 41 so that the studs 43 can extend through the basic blade 40. A pin 44 is then passed through a transverse hole in each stud 43 to lock it temporarily in place. This can be a single pin as shown, or a solid pin locked by a spring pin, each held by a chain to prevent loss, as shown in FIG. 3.

The extension shown in FIG. 4 can be hung on blade 40 at times when a snowplow blade extension is not needed, by providing a second group of holes 45 far enough from the end of the blade 40 that studs 43 in holes 45 will place the extension 42 snugly against blade 40 where it can be carried conveniently or can be used for snow removal where a short blade is preferred.

In the embodiment just described, the thickness of extension 42 is so small as not to affect noticeably the transverse movement of snow, along the length of the blade 40.

I claim:

1. The combination of a snowplow blade on a motorized vehicle, with a tubular socket which extends longitudinally of the blade on its back surface and which is an immovable part of the blade structure, and with a removable extension of a shape corresponding to that of the blade and from which projects a longitudinal stud fitting the socket for removably holding the extension in a working position beyond an end of the blade, and a locking device for preventing unintended motion of the stud out of the socket.

2. The combination of claim 1, with an extension for each end of the blade.

3. The combination of claim 1, in which the socket has an opening extending completely through and the stud is long enough to extend completely through the opening.

4. The combination of claim 3, in which the locking device is a pin, and in which the stud has a transverse hole to receive the pin for latching the stud against removal.

5. The combination of claim 4 in which a spring clip holds the pin against accidental displacement.

6. The combination of claim 5, in which there are two parallel sockets and studs for each extension.

7. The combination of claim 6 including a hammer pad on the extension for receiving blows for loosening a stuck extension.

8. The combination of claim 6, with an extension for each end of the blade.

9. The combination of claim 7, with an extension for each end of the blade.

10. The combination of claim 5 in which the pin and clip are chained to the snowplow blade.

* * * * *